(12) United States Patent
Patwardhan et al.

(10) Patent No.: US 10,694,452 B2
(45) Date of Patent: Jun. 23, 2020

(54) FOREIGN AP HANDLING IN 802.11AX BY COLOR MATCHING

(71) Applicant: Hewlett Packard Enterprise Development LP, Houston, TX (US)

(72) Inventors: Gaurav Patwardhan, Santa Clara, CA (US); Sachin Ganu, San Jose, CA (US); Eldad Perahia, Park City, UT (US); Dongwoon Hahn, San Jose, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/058,985

(22) Filed: Aug. 8, 2018

(65) Prior Publication Data
US 2020/0053634 A1 Feb. 13, 2020

(51) Int. Cl.
*H04W 4/00* (2018.01)
*H04W 48/16* (2009.01)
*H04L 12/26* (2006.01)
*H04W 72/04* (2009.01)
*H04W 24/08* (2009.01)
*H04W 16/18* (2009.01)
(Continued)

(52) U.S. Cl.
CPC ......... *H04W 48/16* (2013.01); *H04L 43/0876* (2013.01); *H04W 16/18* (2013.01); *H04W 24/08* (2013.01); *H04W 72/0453* (2013.01); *H04W 72/082* (2013.01); *H04W 84/12* (2013.01)

(58) Field of Classification Search
CPC ... H04W 48/16; H04W 16/18; H04W 72/082; H04W 72/0453; H04W 24/08; H04W 84/12; H04L 43/0876

USPC .............................. 370/329, 330, 252, 254
See application file for complete search history.

(56) References Cited

U.S. PATENT DOCUMENTS

| | | | |
|---|---|---|---|
| 9,820,162 B2 | 11/2017 | Wang et al. | |
| 2015/0036662 A1* | 2/2015 | Chen | H04W 36/08 370/332 |

(Continued)

FOREIGN PATENT DOCUMENTS

WO 2016/112306 A1 7/2016

OTHER PUBLICATIONS

What Is BSS Coloring in 802.11ax?, (Research Paper), Mar. 6, 2018, 6 Pgs.

(Continued)

*Primary Examiner* — Chuong T Ho
(74) *Attorney, Agent, or Firm* — Hewlett Packard Enterprise Patent Department

(57) ABSTRACT

Systems and methods for assigning BSS colors in a deployed wireless area network (WLAN) include identifying a plurality of APs of an external wireless network operating on a same channel as a deployed AP of a deployed wireless network; selecting as a subset of the plurality of APs of the external wireless network those APs of the external wireless network based on expected interference; grouping the APs of the subset of the plurality of APs by a basic service set (BSS) color used by each of the plurality of identified APs of the external wireless network to form AP BSS color groups; calculating an airtime utilization for each AP color group; and selecting a BSS color using the calculated airtime utilization and assigning the selected BSS color for use by the deployed AP of the deployed wireless network.

14 Claims, 9 Drawing Sheets

(51) Int. Cl.
*H04W 72/08* (2009.01)
*H04W 84/12* (2009.01)

(56) References Cited

U.S. PATENT DOCUMENTS

| | | |
|---|---|---|
| 2015/0139031 A1 | 5/2015 | Kang et al. |
| 2016/0066257 A1 | 3/2016 | Liu et al. |
| 2016/0345258 A1 | 11/2016 | Zhou et al. |
| 2016/0374087 A1 | 12/2016 | Liu et al. |
| 2017/0255659 A1 | 9/2017 | Cariou et al. |
| 2017/0303311 A1 | 10/2017 | Chu et al. |
| 2018/0020478 A1 | 1/2018 | Derham et al. |
| 2018/0063718 A1 | 3/2018 | Lan et al. |
| 2019/0075469 A1* | 3/2019 | Mahoney ............... H04W 16/12 |
| 2019/0124542 A1* | 4/2019 | Pandey ............. H04W 28/0252 |
| 2019/0208423 A1 | 7/2019 | Cherian et al. |
| 2019/0281608 A1* | 9/2019 | Huang .................. H04W 48/20 |

OTHER PUBLICATIONS

Extended European Search Report received for EP Patent Application No. 19185407 4, dated Dec. 12, 2019, 05 pages.
Extended European Search Report received for EP Patent Application No. 19194795.1, dated Jan. 24, 2020, 06 pages.
Fischer et al., "CR Spatial Reuse Group Management CID 12044 12304", IEEE, Jan. 18, 2018, vol. 802, pp. 1-15.
Hedayat et al., "Spatial Reuse Group Challenges", IEEE, Mar. 13, 2017, vol. 802, pp. 1-12.

* cited by examiner

| BSSID | RSSI | Color |
|---|---|---|
| 00:00:00:00:00:01 | -52 | 1 |
| 00:00:00:00:00:02 | -62 | 1 |
| 00:00:00:00:00:03 | -68 | 2 |
| 00:00:00:00:00:04 | -72 | 2 |
| 00:00:00:00:00:05 | -82 | 3 |
| 00:00:00:00:00:06 | -92 | 3 |

Fig. 5

| BSSID | RSSI | Color |
|---|---|---|
| 00:00:00:00:00:02 | -62 | 1 |
| 00:00:00:00:00:03 | -68 | 2 |
| 00:00:00:00:00:04 | -72 | 2 |
| 00:00:00:00:00:05 | -82 | 3 |

Fig. 6

| Color | BSSIDs |
|---|---|
| 1 | 00:00:00:00:00:02 |
| 2 | 00:00:00:00:00:03, 00:00:00:00:00:04 |
| 3 | 00:00:00:00:00:05 |

Fig. 8

| Color | BSSIDs | Total Airtime utilization of all BSSIDs. |
|---|---|---|
| 2 | 00:00:00:00:00:03, 00:00:00:00:00:04 | 24% |
| 1 | 00:00:00:00:00:02 | 20% |
| 3 | 00:00:00:00:00:05 | 18% |

Fig. 9

| Color | BSSIDs | Total Airtime utilization |
|---|---|---|
| 2 | 00:00:00:00:00:03, 00:00:00:00:00:04 | 24% |
| 3 | 00:00:00:00:00:05 | 18% |

Fig. 10

FOREIGN AP HANDLING IN 802.11AX BY COLOR MATCHING

DESCRIPTION OF RELATED ART

The explosion and proliferation of wireless electronic devices has led to an increasing number of challenges in trying to accommodate the increasing number of users on wireless communication channels. For example, high levels of interference brought about by large numbers of users threatens to degrade the levels of network performance that users have come to expect. The IEEE 802.11 networks have continued to evolve in an attempt to address these challenges. These challenges have been addressed to some extent by introducing Dynamic Sensitivity Control (DSC) and Basic Service Sets (BSS) Color schemes in IEEE 802.11ax and IEEE 802.11ah implementations, respectively. These schemes are intended to improve network throughput and spectrum efficiency in dense environments. Particularly, BSS Coloring was introduced in 802.11ah to increase the network capacity in dense environments by improving the ability to reuse frequencies.

This spatial reuse feature allows two devices existing in different adjoining BSSs in the same frequency channel to transmit simultaneously if certain conditions are met. These conditions are described by using different CCA (Clear Channel Assessment) levels for inter-BSS and intra-BSS frames on the same channel. The distinction between inter and intra-BSS frames is given by the color parameter embedded in the packet by the respective BSS. Depending on the CCA thresholds for inter-BSS vs intra-BSS frames, one AP or device may defer medium access to the other AP or device depending on the BSS where the packet originated. This situation creates a possible scenario where a device would have unbalanced channel access, allowing it to transmit more often than its neighboring device.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

FIG. 5 illustrates an example of a list of competing APs (BS SS) for a competing network. In this example, there are 6 competing APs that are potential candidates in accordance with one embodiment.

FIG. 6 illustrates an example of a selected subset of competing APs based on signal strength in accordance with one embodiment.

FIG. 8 illustrates an example of the APs from FIG. 6 sorted by their assigned BSS colors 1, 2 and 3 in accordance with one embodiment.

FIG. 9 illustrates an example of airtime utilization as a metric for quantifying interference presented to the deployed APs in accordance with one embodiment.

FIG. 10 illustrates a result of removing groups that interfere with deployed BSS colors of the deployed AP in terms of the example of FIG. 9 in accordance with one embodiment.

Figure 1:
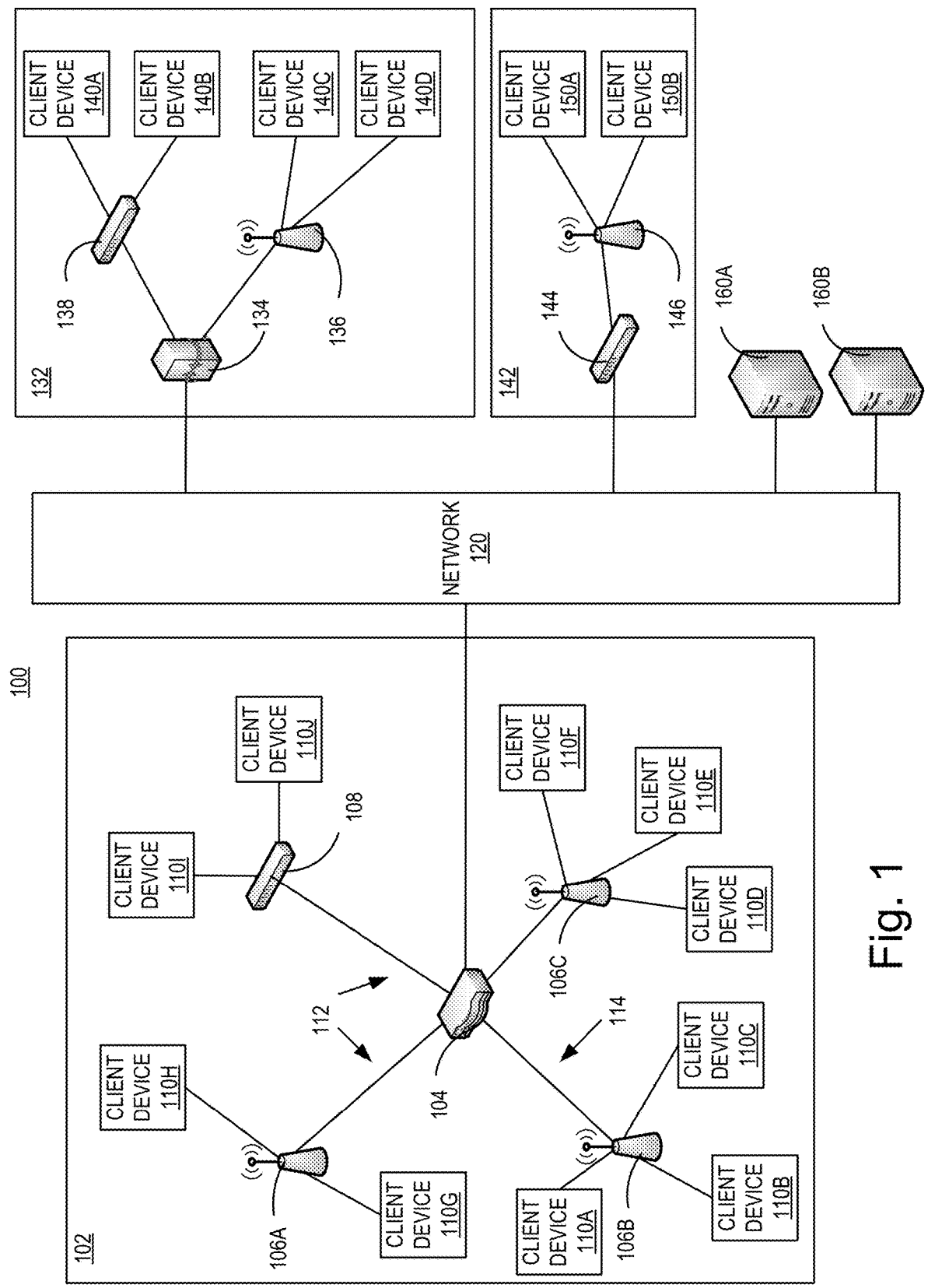
FIG. 1 illustrates one example of a network configuration that may be implemented for an organization, such as a business, educational institution, governmental entity, healthcare facility or other organization.

The figures are not exhaustive and do not limit the present disclosure to the precise form disclosed.

DETAILED DESCRIPTION

Implementations of the disclosed technology may include systems and methods to select a BSS color for a deployed AP of a local wireless network to improve channel utilization, in which the selection may be based on BSS colors in use by competing APs in an external wireless network.

As described in more detail with reference to FIG. 1, a Wireless Lan (WLAN) may include a plurality of Access Points (APs), as elements of the WLAN. These APs in the deployed network may be referred to as deployed APs for ease of discussion. In addition, nearby, separate, WLANs (which may be referred to as external wireless networks) may include their own APs that could cause interference with, and compete for bandwidth against, the deployed APs of the local wireless network. These external-network APs may be referred to as competing APs for ease of discussion.

Competing APs are defined as the APs present in and around the WLAN deployment (i.e. deployed APs) under consideration and not under the control of the network operator. These competing APs may also use spatial reuse, and coloring may cause operational hindrances by allowing an unbalanced channel access, in which a competing AP assigned a given channel and BSS color is allocated a greater amount of channel time than a deployed AP within its range. This may also create network security issues. For example, assume the competing AP has a CCA level at −62 dBm whereas the deployed APs have their CCA at −82 dBm. This will create an asymmetric channel access based on sensitivity, working in the favor of the competing APs. This channel access problem is especially pronounced in dense deployments. Accordingly, systems and methods disclosed herein may provide a solution to address the problem of unbalanced channel access when the APs in the deployment and the competing APs are 11ax capable and are operating on the same channel (i.e. they are co-channel).

In some embodiments, systems and methods may be implemented to match the BSS color of a deployed AP to the color of a competing AP to gain back channel access from the competing AP for the STAs associated to the deployed AP. As a result, the deployed APs may have a more balanced channel access vis-à-vis the competing AP, or may even obtain an edge over the competing AP in terms of channel access. Embodiments may include determining an overlapping co-channel of a competing AP network operating on a the same BSS color as the deployed AP network. The controller may then determine a subset of most the affected deployed APs in the network to remediate the color-related issues. Then, for the subset of these most affected operator network APs, the controller may determine the competing AP neighbors that cause most impact. In view of these neighbors, the controller may select a BSS color to improve channel assignment balance in favor of one or more deployed APs and assign the selected color to those deployed APs.

Before describing embodiments of the disclosed systems and methods in detail, it is useful to describe an example network installation with which these systems and methods might be implemented in various applications. FIG. 1 illustrates one example of a network configuration 100 that may be implemented for an organization, such as a business, educational institution, governmental entity, healthcare facility or other organization. This diagram illustrates an example of a configuration implemented with an organization having multiple users (or at least multiple client devices 110) and possibly multiple physical or geographical sites 102, 132, 142. The network configuration 100 may include a primary site 102 in communication with a network 120. The network configuration 100 may also include one or more remote sites 132, 142, that are in communication with the network 120.

The primary site 102 may include a primary network, which can be, for example, an office network, home network or other network installation. The primary site 102 network may be a private network, such as a network that may include security and access controls to restrict access to authorized users of the private network. Authorized users may include, for example, employees of a company at primary site 102, residents of a house, customers at a business, and so on.

In the illustrated example, the primary site 102 includes a controller 104 in communication with the network 120. The controller 104 may provide communication with the network 120 for the primary site 102, though it may not be the only point of communication with the network 120 for the primary site 102. A single controller 104 is illustrated, though the primary site may include multiple controllers and/or multiple communication points with network 120. In some embodiments, the controller 104 communicates with the network 120 through a router (not illustrated). In other embodiments, the controller 104 provides router functionality to the devices in the primary site 102.

A controller 104 may be operable to configure and manage network devices, such as at the primary site 102, and may also manage network devices at the remote sites 132, 134. The controller 104 may be operable to configure and/or manage switches, routers, access points, and/or client devices connected to a network. The controller 104 may itself be, or provide the functionality of, an access point.

The controller 104 may be in communication with one or more switches 108 and/or wireless Access Points (APs) 106a-c. Switches 108 and wireless APs 106a-c provide network connectivity to various client devices 110a-j. Using a connection to a switch 108 or AP 106a-c, a client device 110a-j may access network resources, including other devices on the (primary site 102) network and the network 120.

Examples of client devices may include: desktop computers, laptop computers, servers, web servers, authentication servers, authentication-authorization-accounting (AAA) servers, Domain Name System (DNS) servers, Dynamic Host Configuration Protocol (DHCP) servers, Internet Protocol (IP) servers, Virtual Private Network (VPN) servers, network policy servers, mainframes, tablet computers, e-readers, netbook computers, televisions and similar monitors (e.g., smart TVs), content receivers, set-top boxes, personal digital assistants (PDAs), mobile phones, smart phones, smart terminals, dumb terminals, virtual terminals, video game consoles, virtual assistants, Internet of Things (IOT) devices, and the like.

Within the primary site 102, a switch 108 is included as one example of a point of access to the network established in primary site 102 for wired client devices 110i-j. Client devices 110i-j may connect to the switch 108 and through the switch 108, may be able to access other devices within the network configuration 100. The client devices 110i-j may also be able to access the network 120, through the switch 108. The client devices 110i-j may communicate with the switch 108 over a wired 112 connection. In the illustrated example, the switch 108 communicates with the controller 104 over a wired 112 connection, though this connection may also be wireless.

Wireless APs 106a-c are included as another example of a point of access to the network established in primary site 102 for client devices 110a-h. Each of APs 106a-c may be a combination of hardware, software, and/or firmware that is configured to provide wireless network connectivity to wireless client devices 110a-h. In the illustrated example, APs 106a-c can be managed and configured by the controller 104. APs 106a-c communicate with the controller 104 and the network over connections 112, which may be either wired or wireless interfaces.

The network configuration 100 may include one or more remote sites 132. A remote site 132 may be located in a different physical or geographical location from the primary site 102. In some cases, the remote site 132 may be in the same geographical location, or possibly the same building, as the primary site 102, but lacks a direct connection to the network located within the primary site 102. Instead, remote site 132 may utilize a connection over a different network, e.g., network 120. A remote site 132 such as the one illustrated in FIG. 1 may be, for example, a satellite office, another floor or suite in a building, and so on. The remote site 132 may include a gateway device 134 for communicating with the network 120. A gateway device 134 may be a router, a digital-to-analog modem, a cable modem, a Digital Subscriber Line (DSL) modem, or some other network device configured to communicate to the network 120. The remote site 132 may also include a switch 138 and/or AP 136 in communication with the gateway device 134 over either wired or wireless connections. The switch 138 and AP 136 provide connectivity to the network for various client devices 140a-d.

In various embodiments, the remote site 132 may be in direct communication with primary site 102, such that client devices 140a-d at the remote site 132 access the network resources at the primary site 102 as if these clients devices 140a-d were located at the primary site 102. In such embodiments, the remote site 132 is managed by the controller 104 at the primary site 102, and the controller 104 provides the necessary connectivity, security, and accessibility that enable the remote site 132's communication with the primary site 102. Once connected to the primary site 102, the remote site 132 may function as a part of a private network provided by the primary site 102.

In various embodiments, the network configuration 100 may include one or more smaller remote sites 142, comprising only a gateway device 144 for communicating with the network 120 and a wireless AP 146, by which various client devices 150a-b access the network 120. Such a remote site 142 may represent, for example, an individual employee's home or a temporary remote office. The remote site 142 may also be in communication with the primary site 102, such that the client devices 150a-b at remote site 142 access network resources at the primary site 102 as if these client devices 150*a-b* were located at the primary site 102. The remote site 142 may be managed by the controller 104 at the primary site 102 to make this transparency possible. Once connected to the primary site 102, the remote site 142 may function as a part of a private network provided by the primary site 102.

The network 120 may be a public or private network, such as the Internet, or other communication network to allow connectivity among the various sites 102, 130 to 142 as well as access to servers 160*a-b*. The network 120 may include third-party telecommunication lines, such as phone lines, broadcast coaxial cable, fiber optic cables, satellite communications, cellular communications, and the like. The network 120 may include any number of intermediate network devices, such as switches, routers, gateways, servers, and/or controllers, which are not directly part of the network configuration 100 but that facilitate communication between the various parts of the network configuration 100, and between the network configuration 100 and other network-connected entities. The network 120 may include various content servers 160*a-b*. Content servers 160*a-b* may include various providers of multimedia downloadable and/or streaming content, including audio, video, graphical, and/or text content, or any combination thereof. Examples of content servers 160*a-b* include, for example, web servers, streaming radio and video providers, and cable and satellite television providers. The client devices 110*a* j, 140*a-d*, 150*a-b* may request and access the multimedia content provided by the content servers 160*a-b*.

Although 10 client devices 110*a-j*, or stations (STAs), are illustrated at primary site 102 in the example of FIG. 1, in various applications, a network may include a lesser or greater quantity of STA's. Indeed, some implementations may include a dramatically larger quantities of STAs. For example, various wireless networks may include hundreds, thousands, or even tens of thousands of STAs communicating with their respective APs, potentially at the same time. As noted above, various IEEE 802.11 networks may implement what is referred to as BSS coloring to increase network capacity in such dense environments. This can allow improvement and frequency reuse among network devices.

Figure 2:
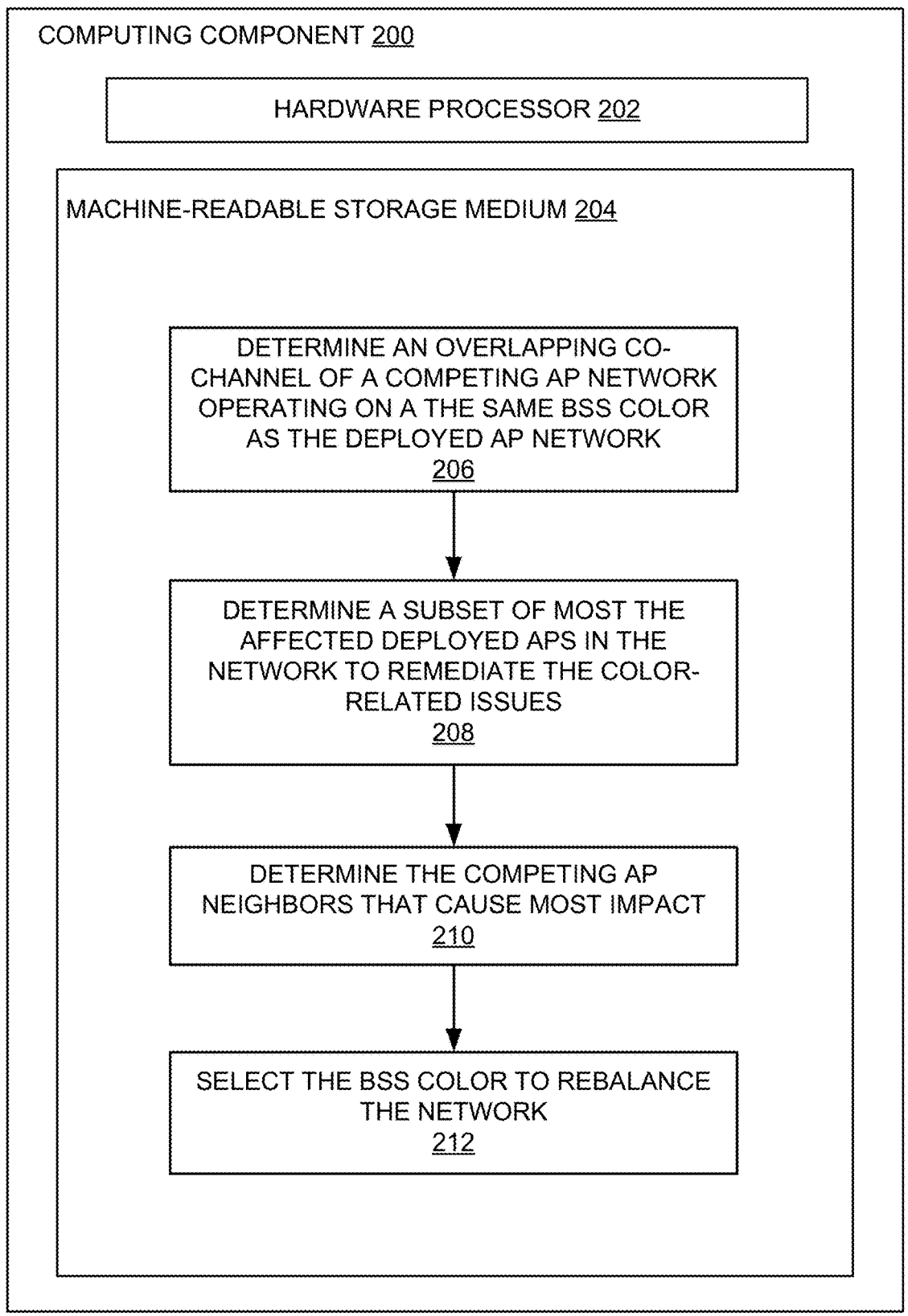
FIG. 2 is a block diagram of an example computing component or device for addressing unbalanced channel assignment in accordance with one embodiment.

FIG. 2 is a block diagram of an example computing component or device 200 for addressing unbalanced channel assignment in accordance with one embodiment. Computing component 200 may be, for example, a server computer, a controller, or any other similar computing component capable of processing data. In the example implementation of FIG. 2, the computing component 200 includes a hardware processor, 202, and machine-readable storage medium, 204. In some embodiments, computing component 200 may be an embodiment of an AP or AP controller, e.g., AP 106*b* or AP controller 104, respectively, or a component of network 120 of FIG. 1, for example. More particularly, computing component 200 may be a component of a central entity such as wireless mobility controller in the network. Although in various embodiments, the color selection to improve channel assignment balancing may be implemented at the wireless mobility controller in the deployed network, in other embodiments, this functionality may be implemented by an AP or AP controller of the deployed network or distributed amongst a plurality of network elements such as APs, AP controllers, and so on. However, for clarity of description, the examples described herein are described in terms of these functions being performed by a wireless mobility controller in the deployed network.

Hardware processor 202 may be one or more central processing units (CPUs), semiconductor-based microprocessors, and/or other hardware devices suitable for retrieval and execution of instructions stored in machine-readable storage medium, 204. Hardware processor 202 may fetch, decode, and execute instructions, such as instructions 206-212, to match the BSS color of a deployed AP to the color of a competing AP to gain back channel access from the competing AP for the STAs associated to the deployed AP. As a result, the deployed APs may have a more balanced channel access vis-à-vis the competing AP, or may even obtain an edge over the competing AP in terms of channel access. As an alternative or in addition to retrieving and executing instructions, hardware processor 202 may include one or more electronic circuits that include electronic components for performing the functionality of one or more instructions, such as a field programmable gate array (FPGA), application specific integrated circuit (ASIC), or other electronic circuits.

Figure 3:
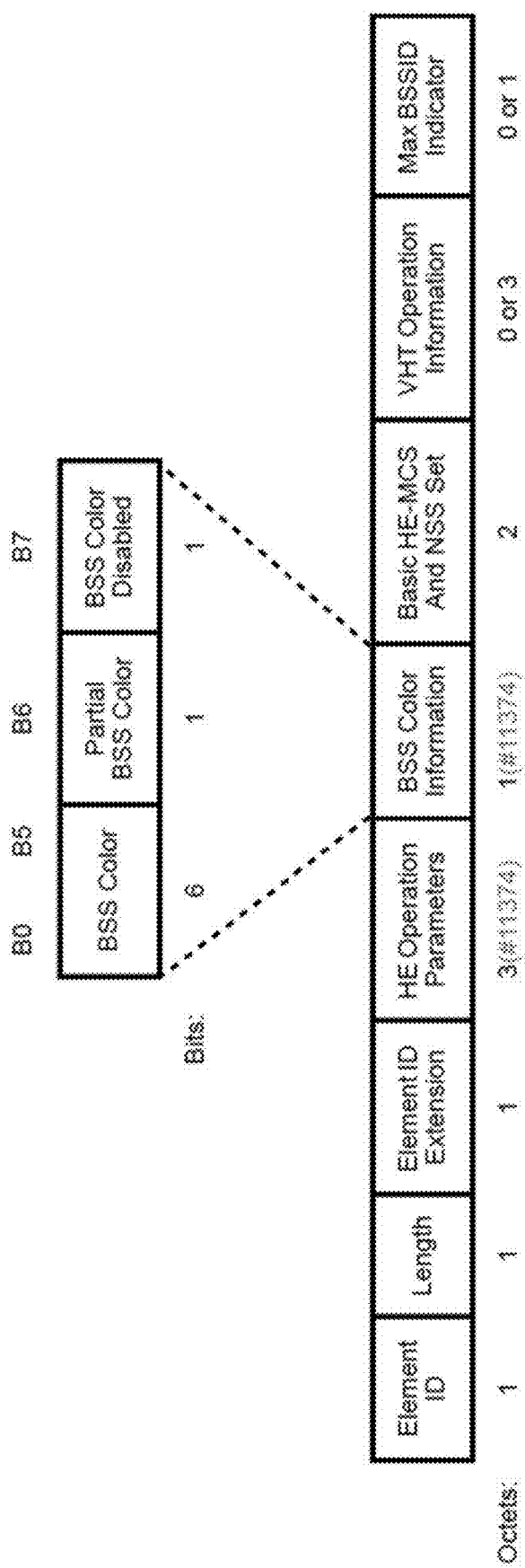
FIG. 3 illustrates an example of an operation element format for an IEEE 802.11ax network beacon that specifies BSS color information.

A machine-readable storage medium, such as machine-readable storage medium 204, may be any electronic, magnetic, optical, or other physical storage device that contains or stores executable instructions. Thus, machine-readable storage medium 204 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 202 may be a non-transitory storage medium, where the term "non-transitory" does not encompass transitory propagating signals. As described in detail below, machine-readable storage medium 202 may be encoded with executable instructions, for example, instructions 206-212, for BSS color Matching Hardware processor 202 may execute instruction 206 to determine an overlapping co-channel of a competing AP network operating on a the same BSS color as the deployed AP network. This can be accomplished in various embodiments by monitoring the beacons of the overlapping competing AP network and examining the information elements (IEs) in the beacon. For example, the color of the competing APs can be determined by the IEs in the beacon as well as the BSS_COLOR field. FIG. 3 illustrates an example of an operation element format for an IEEE 802.11ax network beacon that specifies BSS color information. The BSS color field of this operation element indicates the BSS color and its state. As illustrated, the BSS color information octet is eight bits in length (B0-B7) it includes 6 bits for BSS color, one bit for partial BSS color, and one bit for BSS color disabled. In networks using other network protocols, other information may be used to determine an assigned BSS color for competing APs in a neighboring network.

In some network implementations, an HE-SIG-A operation element is included after the legacy preamble of network transmissions to indicate common control information. This information may include a BSS color field identifying the BSS color assigned to the network element. For example, in terms of an HG-SIG-A field of an HE SU PPDU and HE ER SU PPDU, the BSS color field can occupy 6 bits at locations B8-B13 to specify the value of the TXVECTOR parameter BSS_COLOR.

Hardware processor 202 may execute instruction 208 to determine a subset of most the affected deployed APs in the network to remediate the color-related issues. For example, conditions that may trigger the process may include: (i) The deployed AP under consideration is an edge AP, which may be closer to a competing AP; (ii) The channel utilization by competing APs is detected as relatively high compared with deployed APs; or (iii) The deployed AP under consideration is provisioned like a root access point (RAP). Where deployed APs are edge APs, they may be closer to competing network elements and may therefore be more susceptible to suffering from channel assignment imbalance as a result. Likewise, where the channel utilization by competing APs is high, this can have a negative impact on the channel availability for deployed APs. Where a deployed AP is a RAP, it may have a wired connection to its controller.

Hardware processor 202 may execute instruction 210 to, for the subset of these most affected operator network APs, determine the competing AP neighbors that cause most impact. An example implementation of instruction 210 is explained in detail with reference to instructions 412 through 420 of FIG. 4, below. Hardware processor 202 may execute instruction 212 to select a BSS color to improve channel assignment balance in favor of one or more deployed APs and assign the selected color to those deployed APs. An example implementation of instruction 212 is explained in detail with reference to instruction 422 of FIG. 4, below.

Figure 4:
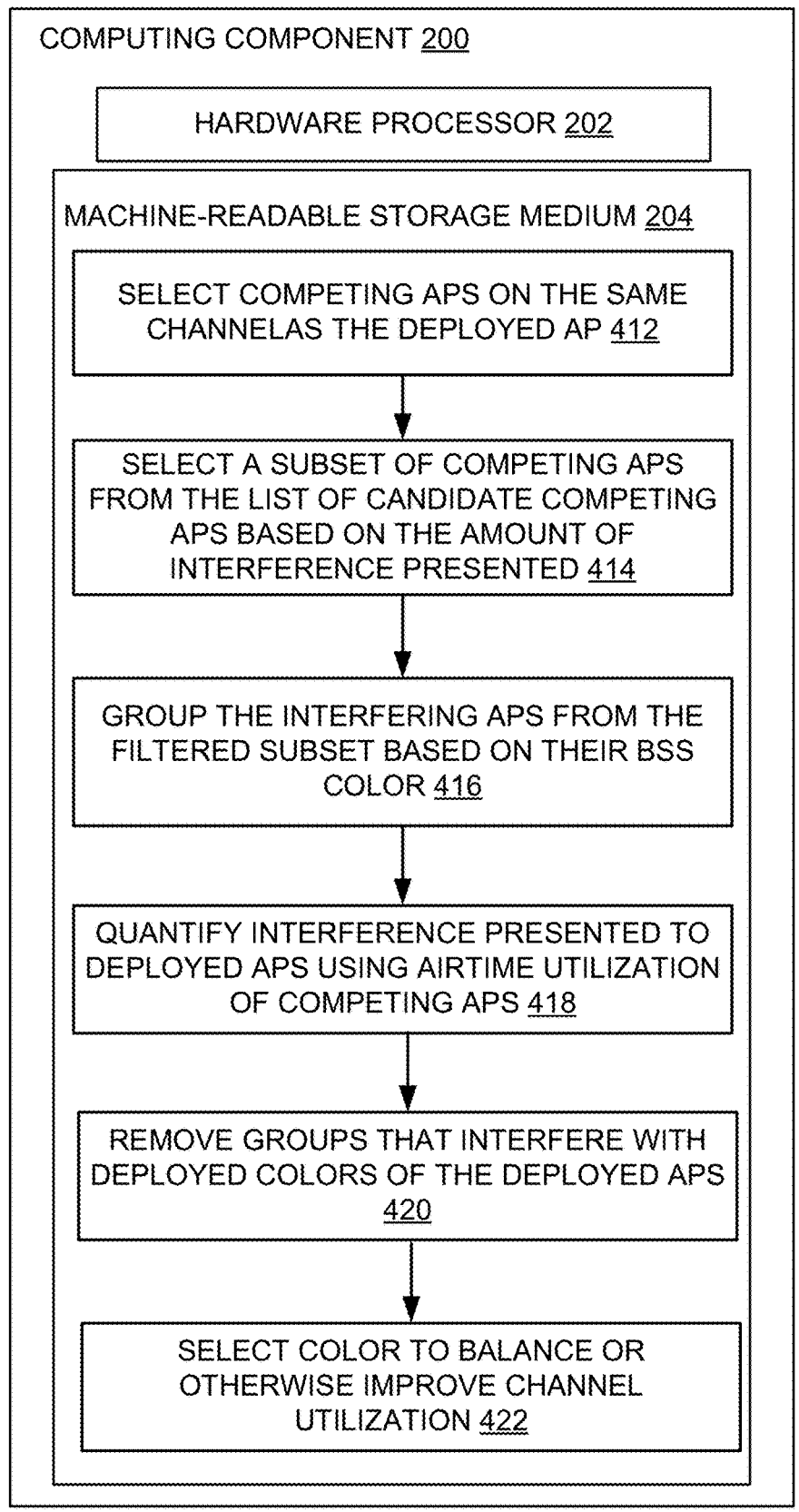
FIG. 4 is a block diagram of an example computing component for selecting a color to improve channel utilization in accordance with one embodiment.

FIG. 4 is a block diagram of an example computing component 200 for selecting a color to improve channel utilization in accordance with one embodiment. Computing component 200, hardware processor 202, and machine readable storage medium 204 as depicted in FIG. 4 may be the same as that illustrated in FIG. 2 or similar thereto. Hardware processor 202 of the radio may execute instruction 412 to select competing APs on the same channel as the deployed AP. FIG. 5 illustrates an example of a list of competing APs (BS SS) for a competing network. In this example, there are 6 competing APs that are potential candidates. These are identified in this example as BSSIDs 00:00:00:00:00:01-00:00:00:00:00:06. In this example, two APs are operating at BSS color 1, two APs are operating at BSS color 2, and two APs are operating at BSS color 3. This table also illustrates the received signal strength (based on the received signal strength indicator (RSSI) for the radio signal) for each candidate competing AP.

Hardware processor 202 of the radio may execute instruction 414 to select a subset of competing APs from this listing of candidate competing APs based on the expected interference. FIG. 6 illustrates an example of a selected subset of competing APs based on signal strength. For example, competing APs having a lower signal strength below a certain threshold are not affected by enabling/disabling BSS coloring at the deployed AP. Accordingly, these APs can be removed from the list of candidate competing APs (BSSs).

Figure 7:
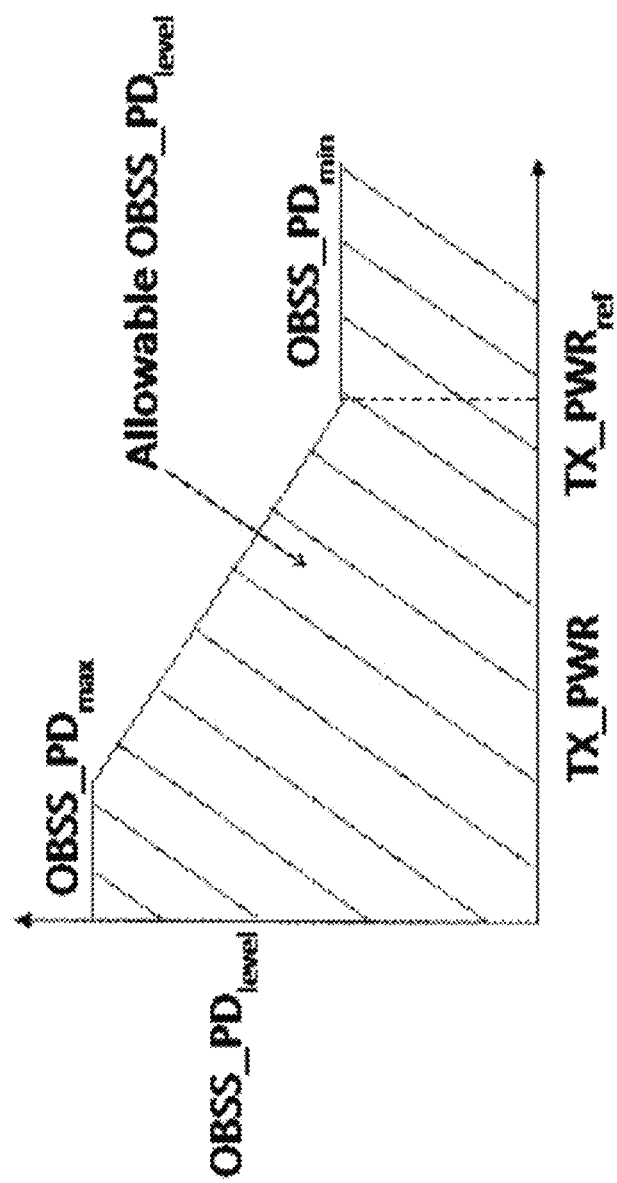
FIG. 7 illustrates an example of BSS coloring thresholds to set an allowable OBSS_PD in accordance with one embodiment.

For example in 802.11ax, if BSS coloring is enabled, spatial reuse is effective only where the RSSI of the OBSS AP is within the specified minimum and maximum range (e.g., OBSS_PD_min and OBSS_PD_max). In terms of 802.11ax, this is from −82 DBM to −62 DBM as illustrated in FIG. 7. With reference now to FIG. 7, reproduced from IEEE 802.11ax D2.2, the BSS coloring thresholds set the allowable OBSS_PD levels as those OBSS_PD levels between the defined OBSS_PD_min and OBSS_PD_max levels.

Returning now to FIG. 6, in this example the filtered subset includes APs with BSSIDs 00:00:00:00:00:02, 00:00:00:00:00:03, 00:00:00:00:00:04, 00:00:00:00:00:05, having RSSIs of −62 DBM, −68 DBM, −72 DBM, and −82 DBM, respectively; and BSS colors 1, 2, 2 and 3, respectively.

Hardware processor 202 of the radio may execute instruction 416 to group the interfering APs from the filtered subset based on their BSS color. FIG. 8 illustrates an example of the APs from FIG. 6 sorted by their assigned BSS colors 1, 2 and 3. As illustrated in this example, the group of APs with color 1 is a single AP with the BSSID 00:00:00:00:00:02; the group of APs having color 2 is the 2 APs with the BSS IDs 00:00:00:00:00:03, 00:00:00:00:00:04; and the group of APs having color 3 is the single AP with the BSSID 00:00:00:00:00:05.

Returning now to FIG. 4, hardware processor 202 of the radio may execute instruction 418 to use airtime utilization of the competing APs in the list as a metric for quantifying the interference presented to the deployed APs. An example of this is illustrated at FIG. 9. In some embodiments, this can be accomplished by finding the airtime utilization of the BSS on each competing AP in the filtered, grouped list. For example, one approach for determining the airtime utilization is to add up the airtime utilization for each of the competing APs in each of the color groups to determine a total utilization for each color group. The groups can then be sorted based on the total airtime utilization for each group. In the example of FIG. 9, the groups are sorted by this metric in a descending fashion. Accordingly, the BSS color group with the largest airtime utilization will be at the top of the list. In other words, the topmost entry in the sorted list is a list of competing APs of the same color utilizing the channel the most. In other embodiments, other sorting criteria can be used; while in still other embodiments, the list need not be sorted.

Hardware processor 202 of the radio may execute instruction 420 to remove groups that interfere with deployed colors of the deployed APs. In this operation, the controller removes the groups that have the same BSS colors as the valid neighbors of the deployed AP. This can be done so that the deployed AP does not assign the same color as a valid neighbor AP. FIG. 10 illustrates a result of removing groups that interfere with deployed BSS colors of the deployed AP in terms of the example of FIG. 9. In this example, color group 1 was removed. This would apply, for example, where the deployed AP has a neighbor using BSS color 1.

Hardware processor 202 of the radio may execute instruction 422 to select the color to balance or improve the channel utilization for the deployed Aps. For example the BSS color that will provide the maximum effect on balancing the channel utilization, or on improving channel utilization (toward, or even exceeding balance) is selected. The color may be selected from the color groups remaining in the list (e.g., the groups as shown in FIG. 10). The colors remaining after the removal at operation 440 are the colors that are useful for gaining fair channel access from the competing APs in favor of the deployed network. The deployed AP under consideration may choose any of a number of different optimization goals. For example, in some applications, one optimization goal may be freeing up more of the channel on the deployed AP. This might be a goal, for example, where there is heavy traffic on the deployed AP itself. In this example, the choice might be Color 3 in the example of FIG. 10, because more airtime is available. On the other hand, for a deployed AP to partially disrupt the working of a competing AP, color 2 might be chosen to steal away airtime from the competing AP. In other examples, other optimization goals may be selected, and traffic and AP scanning patterns may alter the optimization goals. In such examples, the color may be selected to achieve those goals.

Figure 11:
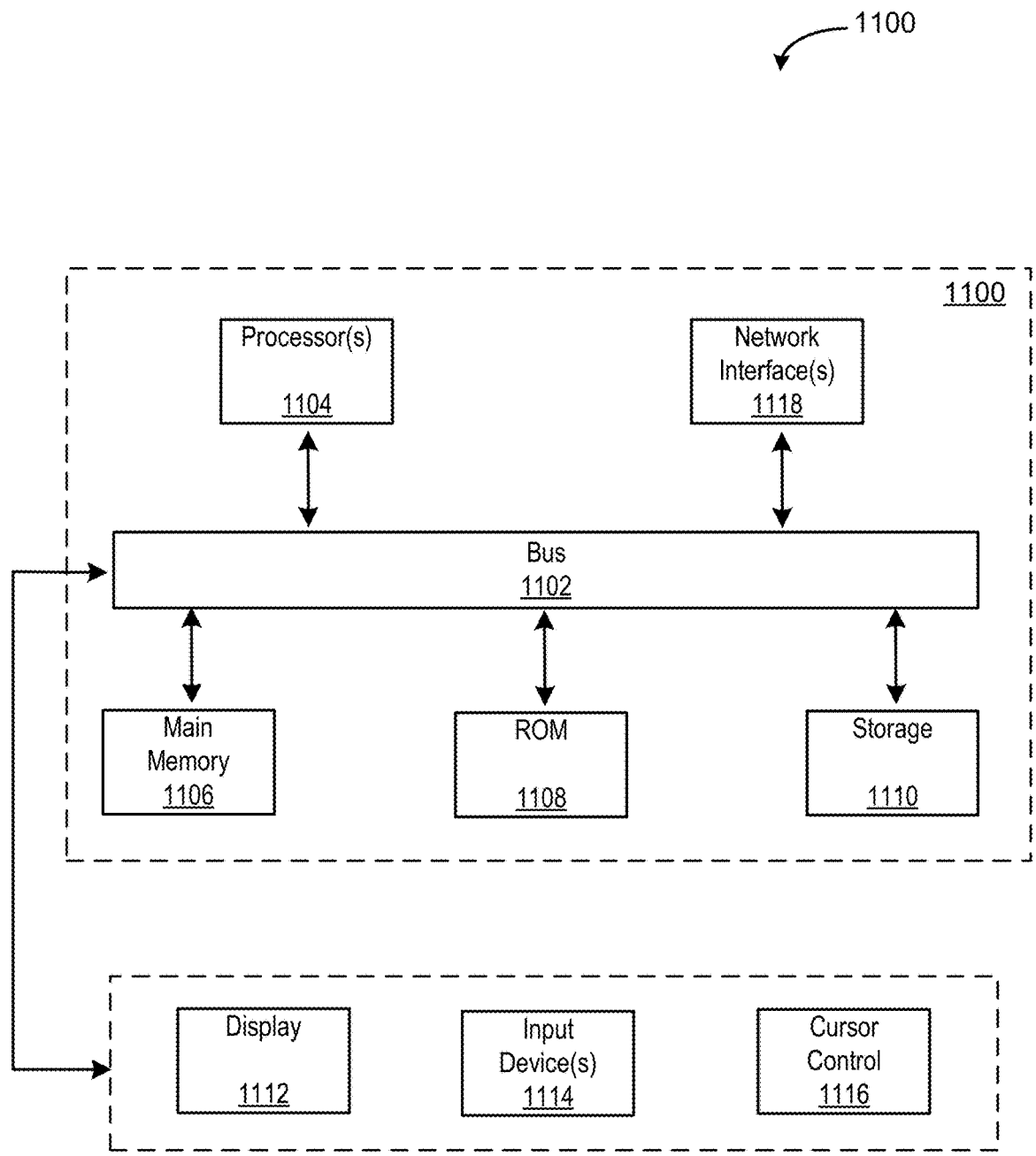
FIG. 11 is an example computing component that may be used to implement various features of embodiments described in the present disclosure.

FIG. 11 depicts a block diagram of an example computer system 1100 in which various of the embodiments described herein may be implemented. The computer system 1100 includes a bus 1102 or other communication mechanism for communicating information, one or more hardware processors 1104 coupled with bus 1102 for processing information.

Hardware processor(s) 1104 may be, for example, one or more general purpose microprocessors.

The computer system 1100 also includes a main memory 1106, such as a random access memory (RAM), cache and/or other dynamic storage devices, coupled to bus 1102 for storing information and instructions to be executed by processor 1104. Main memory 1106 also may be used for storing temporary variables or other intermediate information during execution of instructions to be executed by processor 1104. Such instructions, when stored in storage media accessible to processor 1104, render computer system 1100 into a special-purpose machine that is customized to perform the operations specified in the instructions.

The computer system 1100 further includes a read only memory (ROM) 1108 or other static storage device coupled to bus 1102 for storing static information and instructions for processor 1104. A storage device 1110, such as a magnetic disk, optical disk, or USB thumb drive (Flash drive), etc., is provided and coupled to bus 1102 for storing information and instructions.

The computer system 1100 may be coupled via bus 1102 to a display 1112, such as a liquid crystal display (LCD) (or touch screen), for displaying information to a computer user. An input device 1114, including alphanumeric and other keys, is coupled to bus 1102 for communicating information and command selections to processor 1104. Another type of user input device is cursor control 1116, such as a mouse, a trackball, or cursor direction keys for communicating direction information and command selections to processor 1104 and for controlling cursor movement on display 1112. In some embodiments, the same direction information and command selections as cursor control may be implemented via receiving touches on a touch screen without a cursor.

The computing system 1100 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 1100 may implement the techniques described herein using customized hard-wired logic, one or more ASICs or FPGAs, firmware and/or program logic which in combination with the computer system causes or programs computer system 1100 to be a special-purpose machine. According to one embodiment, the techniques herein are performed by computer system 1100 in response to processor(s) 1104 executing one or more sequences of one or more instructions contained in main memory 1106. Such instructions may be read into main memory 1106 from another storage medium, such as storage device 1110. Execution of the sequences of instructions contained in main memory 1106 causes processor(s) 1104 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 1110. Volatile media includes dynamic memory, such as main memory 1106. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 1102. Transmission media can also take the form of acoustic or light waves, such as those generated during radio-wave and infra-red data communications.

The computer system 1100 also includes a communication interface 1118 coupled to bus 1102. Network interface 1118 provides a two-way data communication coupling to one or more network links that are connected to one or more local networks. For example, communication interface 1118 may be an integrated services digital network (ISDN) card, cable modem, satellite modem, or a modem to provide a data communication connection to a corresponding type of telephone line. As another example, network interface 1118 may be a local area network (LAN) card to provide a data communication connection to a compatible LAN (or WAN component to communicated with a WAN). Wireless links may also be implemented. In any such implementation, network interface 1118 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 1118, which carry the digital data to and from computer system 1100, are example forms of transmission media.

The computer system 1100 can send messages and receive data, including program code, through the network(s), network link and communication interface 1118. In the Internet example, a server might transmit a requested code for an application program through the Internet, the ISP, the local network and the communication interface 1118.

The received code may be executed by processor 1104 as it is received, and/or stored in storage device 1110, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 1100.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like. The presence of broadening words and phrases such as "one or more," "at least," "but not limited to" or other like phrases in some instances shall not be read to mean that the narrower case is intended or required in instances where such broadening phrases may be absent.

What is claimed is:

1. A non-transitory machine-readable storage medium encoded with instructions executable by a hardware processor of a computing component, the non-transitory machine-readable storage medium comprising instructions to cause the hardware processor to:
    identify a plurality of APs of an external wireless network operating on a same channel as a deployed AP of a deployed wireless network;
    select as a subset of the plurality of APs of the external wireless network those APs of the external wireless network based on expected interference;
    group the APs of the subset of the plurality of APs by a basic service set (BSS) color used by each of the plurality of identified APs of the external wireless network to form AP BSS color groups;
    calculate an airtime utilization for each AP BSS color group by summing airtime utilization for each of the individual APs in each BSS color group to determine a total utilization for each BSS color group; and
    select a BSS color using the calculated airtime utilization and assigning the selected BSS color for use by the deployed AP of the deployed wireless network.

2. The non-transitory machine-readable storage medium of claim 1, wherein the instructions to cause the hardware processor to identify a plurality of APs of an external wireless network operating on a same channel as the deployed AP further cause the hardware processor to determine which co-channel APs of the external network are operating on a same BSS color as the deployed AP.

3. The non-transitory machine-readable storage medium of claim 2, wherein the instructions to cause the hardware processor to determine which co-channel APs of the external network are operating on a same BSS color as the deployed AP cause the hardware processor to examine information elements (IEs) in a beacon of the determined co-channel APs to determine the BSS color and to compare a determined BSS color of the co-channel APs with the BSS color of the deployed AP.

4. The non-transitory machine-readable storage medium of claim 1, wherein the instructions to cause the hardware processor to select as a subset of the plurality of APs of the external network those APs of the external network based on expected interference comprise instructions causing the hardware processor to examine an RSSI of the APs of the external network and filter out from the identified plurality of APs of an external wireless network those APs having a signal strength outside of a determined RSSI range to arrive at the subset.

5. The non-transitory machine-readable storage medium of claim 1, wherein the instructions further cause the processor to remove an AP BSS color group that has the same BSS color as valid neighbors of the deployed AP.

6. The non-transitory machine-readable storage medium of claim 1, wherein the instructions to cause the hardware processor to select a BSS color using the calculated airtime utilization cause the hardware processor to select a BSS color that will provide a maximum effect on balancing the channel utilization between the deployed AP and an AP on the external wireless network.

7. The non-transitory machine-readable storage medium of claim 1, wherein the instructions to cause the hardware processor to select a BSS color using the calculated airtime utilization cause the hardware processor to select a BSS color that will provide a increase the channel utilization of the deployed AP on the external wireless network.

8. A method, comprising:
identifying a plurality of APs of an external wireless network operating on a same channel as a deployed AP of a deployed wireless network;
selecting as a subset of the plurality of APs of the external wireless network those APs of the external wireless network based on expected interference;
grouping the APs of the subset of the plurality of APs by a basic service set (BSS) color used by each of the plurality of identified APs of the external wireless network to form AP BSS color groups;
calculating an airtime utilization for each AP BSS color group by summing airtime utilization for each of the individual APs in each BSS color group to determine a total utilization for each BSS color group; and
selecting a BSS color using the calculated airtime utilization and assigning the selected BSS color for use by the deployed AP of the deployed wireless network.

9. The method of claim 8, wherein identifying a plurality of APs of an external wireless network operating on a same channel as the deployed AP further comprises determining which co-channel APs of the external network are operating on a same BSS color as the deployed AP.

10. The method of claim 9, wherein determining which co-channel APs of the external network are operating on a same BSS color as the deployed AP comprises examining information elements (IEs) in a beacon of the determined co-channel APs to determine the BSS color and comparing a determined BSS color of the co-channel APs with the BSS color of the deployed AP.

11. The method of claim 8, wherein selecting as a subset of the plurality of APs of the external network those APs of the external network based on expected interference comprises examining an RSSI of the APs of the external network and filtering out from the identified plurality of APs of an external wireless network those APs having a signal strength outside of a determined RSSI range to arrive at the subset.

12. The method of claim 8, further comprising removing an AP BSS color group that has the same BSS color as valid neighbors of the deployed AP.

13. The method of claim 8, wherein selecting a BSS color using the calculated airtime utilization comprises selecting a BSS color that will provide a maximum effect on balancing the channel utilization between the deployed AP and an AP on the external wireless network.

14. The method of claim 8, selecting a BSS color using the calculated airtime utilization comprises selecting a BSS color that will provide a increase the channel utilization of the deployed AP on the external wireless network.

* * * * *